Patented Oct. 24, 1950

2,526,683

UNITED STATES PATENT OFFICE 2,526,683

METHYL CELLULOSE CAPSULES AND PROCESS OF MANUFACTURE

Hubert W. Murphy, Indianapolis, Ind., assignor to Eli Lilly and Company, Indianapolis, Ind., a corporation of Indiana No Drawing. Application April 13, 1946,
Serial No. 662,102

6 Claims. (Cl. 167—83)

This invention relates to medicinal capsules and more particularly to capsules of etherified cellulosic material such as methyl cellulose, and to methods of manufacturing the same.

For over a century capsules have been made almost universally from gelatin despite the fact that the manufacture and use of such capsules are attended with difficulties. While alternative materials, such as cellulose acetate, have been proposed for use in capsule manufacture, and while such proposed materials may not be subject to certain of the deficiencies and defects possessed by gelatin capsules, other difficulties, principally in the manufacture of the capsules, are encountered.

Objects of this invention are to provide medicinal capsules which have substantial advantages over prior capsules, both in general utility and in manufacture, and to provide a convenient and rapid process for their manufacture.

Medicinal capsules provided in accordance with this invention are prepared from a readily available and inexpensive material. They are non-toxic. In contrast to capsules made from cellulose acetate or gelatin, they do not become soft or sticky or acquire an unpleasant taste or odor when exposed to relatively high humidity. Furthermore they do not become dry and brittle when filled with materials having hygroscopic properties or when exposed to air of low humidity. They retain their strength and form even when containing compositions of relatively high or low pH. They are not attacked by microorganisms such as molds, as frequently happens with gelatin capsules, especially when exposed to warm and humid atmosphere. They are sturdy and withstand, without fracturing, the mechanical shocks encountered in ordinary handling, and in filling and packaging operations. They are readily disintegrated when taken internally, thus making available their medicinal contents. Further, the time required for disintegration may be controlled within limits. They may be made in a wide variety of colors and may be made opaque or clear as desired.

The medicinal capsules provided by this invention are prepared from methyl cellulose which is soluble in cold water, insoluble in hot water, and possesses peculiar gelling characteristics. Water solutions of such methyl cellulose vary in viscosity with temperature changes in a way quite different from gelatin solutions. Whereas the viscosity of gelatin solutions continuously decreases with rising temperatures through a relatively wide range, with the gelation point at the lower end of the temperature curve, the viscosity of these cellulose derivatives decreases with a rise in temperature through a relatively narrow range of low temperatures, and then increases rapidly through an exceedingly narrow range of rising temperature with gel formation a few degrees above the temperature at which minimal viscosity is displayed.

The methyl cellulose I employ in making my novel medicinal capsules is of a type having an unusually low intrinsic viscosity, advantageously in the range of about 7 to 15 cps. (centipoises) intrinsic viscosity. (By intrinsic viscosity is meant the viscosity displayed under certain standard conditions, arbitrarily chosen as 2 per cent concentration in distilled water solution at 20° C.) In this range I prefer to use methyl cellulose types of about 8 to 10 cps. intrinsic viscosity.

As exemplified, there is employed in the making of my capsules, methyl cellulose with a methoxyl content of about 30 percent and which when dissolved in distilled water at a concentration of 2 percent yields a solution which displays an intrinsic viscosity of about 9 cps. at 20° C.

The intrinsic viscosity characteristic of the methyl cellulose is a very important factor in determining the rate of mass production of capsules. For example, it requires about 10 times as long for the formation of capsules from a coating composition prepared from a methyl cellulose of the 15 cps. intrinsic viscosity type as it does from a coating composition prepared from the 9 centipoise type. Moreover, it has been found that whenever the intrinsic viscosity characteristic is decreased much beyond that of the 7 centipoise type, the quality of the capsular wall, particularly with regard to tensile strength, elasticity, and yield point, is excessively reduced and otherwise seriously affected.

In the production of methyl cellulose capsules, I prepare a clear, substantially bubble-free coating composition desirably containing from 15 to 20 percent of a low viscosity type methyl cellulose. This is accomplished, for example, by treating 5.2 kg. of low viscosity methyl cellulose, designated as 9 centipoise type, with 27 liters of boiling water to facilitate wetting of the cellulose particles. This mixture is then cooled and maintained at a temperature of about 5° C. for 12 to 24 hours during which time complete solution of the methyl cellulose takes place. If air bubbles persist, they can be removed by subjecting the solution to vacuum, but in most instances this will not be necessary. This coating composition is very stable and can be stored at about 10° C. for months without being attacked by microorganisms or apparent change in viscosity. At 15 percent concentration, such a solution of methyl cellulose has viscosity of about 8000 cps. at 2° C. and 4500 cps. at 18° C.

This composition is used to coat capsule-forming members, such as round-ended, highly polished, stainless steel pins, by dipping them into the composition for a few seconds.

It is desirable to maintain the coating composition at a temperature a few degrees below the temperature at which it displays a minimum viscosity because there is a very rapid rise in viscosity and subsequent gel formation if the temperature is raised only a few degrees beyond this point of minimal value. In general, temperatures within the range of about 5° to 20° C. will be employed. The clear, bubble-free coating composition described above desirably is maintained at a temperature of about 18° C. during the coating operations.

Before being immersed in the cold methyl cellulose solution, the capsule-forming pins are suitably heated to a temperature substantially above the gelation point of the solution employed. With the specific composition described above, a pin temperature of about 65° C. desirably is employed, and this temperature causes rapid gelling of the composition in contact with the pins. It has been found that by operating under these conditions, a very uniform capsular wall is obtained, largely because that portion of the coating composition which immediately surrounds that portion gelating on the capsule-forming pin is heated sufficiently (as will be hereinafter described) to bring it to the temperature at which the lowest viscosity is displayed. Among other things, this causes free draining of excess coating material from the pins when they are withdrawn, and contributes to the uniform distribution of the coating on the pins.

A plurality of capsule-forming pins can be coated in one dipping operation and conveniently the entire metal portion, including the pins and the bar on which they are mounted, is heated to such a degree that enough latent heat is retained by the metal therein to gelate substantially all the coating composition adherent to the capsule-forming pins within an interval of about 35 seconds after they have been removed from the coating composition. While the temperature to which the metallic portion including the capsule-forming pins must be preheated will vary, as for different sizes of capsules, generally it will fall within the temperature range of about 40° to about 80° C. Moreover, it is also possible to control, to a limited extent, the thickness of the capsule wall by varying the temperature to which the metallic portion is preheated.

The surfaces of the capsule-forming pins desirably are very smooth and highly polished and, although a lubricant for them is not essential, it has been found advantageous in order to facilitate removal of the capsular elements therefrom, to precoat the capsule-forming pins with a very thin uniform film of lubricant before they are immersed in the coating composition. A suitable lubricant comprises a mixture of equal parts of soft soap U. S. P. and anhydrous lanolin with 0.1 percent chromium trioxide.

The heated and lubricated capsule-forming pins are dipped to the required extent in the cold methyl cellulose coating composition to form a coating thereon, and are then withdrawn. The time required in the dipping operation varies with the size of the capsules being formed and is somewhat longer for the larger capsules. With methyl cellulose of the 15 cps. intrinsic viscosity type there is required about 75 seconds to dip and coat the pins for the standard No. 0 capsule. With coating compositions prepared from methyl cellulose of 9 cps. intrinsic viscosity type, the viscosity of the coating composition is such that the time of dipping and coating is about 7 or 8 seconds. The coated pins are then transferred to a drying kiln, while being at first rapidly and then more slowly turned on a median horizontal axis of their supporting member thus evenly distributing the relatively small flowable portion of the coating. A period of about 35 seconds usually serves to obtain substantially complete gelation.

Desirably the drying kiln is so constructed that a method of zone drying is obtained while a current of warm dry air is slowly passed over the coated pins. Thus for about the first 30 minutes in their passage through the kiln, the coated pins are subjected to a temperature of about 40° C. and after this period they advance in the drying kiln into successively warmer regions or zones until a temperature of about 60° C. is obtained about 45 minutes after they have entered the kiln. The movement of air through the kiln is directed from the lower temperature region to the higher temperature region. Infra-red radiation may also be used in drying the capsular elements on the pins. With the aid of infra-red lamps, the time of drying the capsules is only about 50 minutes, this time being dependent to some extent upon the concentration, intrinsic viscosity and thickness of the methyl cellulose.

After drying, the capsule-forming pins bearing the methyl cellulose capsular elements are desirably allowed to cool to about room temperature which effects slight contraction of the capsule-forming pins and thereby promotes easier removal of the methyl cellulose capsular elements. These capsular elements are stripped from the capsule-forming pins, cut to appropriate size, and the bodies and caps assembled as capsules. These operations may be performed manually, or mechanically on appropriately designed machines.

The capsules obtained by this process consist essentially of methyl cellulose and when in equilibrium with air of 40 per cent relative humidity at 20° C., contain about 2.5 percent of water by weight. At higher relative humidities, the capsule will gradually absorb more water and if maintained at a relative humidity of 90 percent, for 48 hours or more, as much as 20 percent of water may be absorbed.

Although these capsules are satisfactory for many purposes, I have found that they can be improved by the addition of an essentially non-toxic plasticizer to the capsule-forming composition, designed to impart to the capsules made therefrom greater flexibility and to prevent excessive hardness and loss of flexibility whenever hygroscopic medicaments are enclosed therein, and to aid in obtaining more rapid disintegration of the capsule in the digestive tract of a patient.

There are a very large number of plasticizers which can be used for this purpose among which may be mentioned: sucrose, invert sugar, dextose, glycerol, lower alkyl fatty acid monoesters of glycerol such as monacetin, monoethers of glycerol such as glycerol α-methyl ether, α- and β-gluco heptonic acid and/or their lactones, and their lower alkyl and glycol esters, glucono-Δ-lactone, γ-valerolactone, α-amino acids such as glycine, ethyl glycinate, amines such as monoethanolamine and triethanolamine, glycols such as propylene glycol, triethylene glycol, 2-ethyl-1,3-hexanediol, 1,3-butylene glycol, glycosides such as α-methyl glucoside, acetopropanol, amides such as acetamide and propionamide, sorbitol, mannitol, lactose, and lower alkyl phosphates such as triethyl phosphate.

The selection of an appropriate plasticizer or combination of plasticizers and the determination of the amount to be used will be governed by certain prime considerations: that the amount present will be essentially non-toxic; that it be not appreciably volatile; that it does not impart a disagreeable odor or taste to the capsule; and that it be inexpensive and readily available. The choice of plasticizer is further governed to some extent by the following factors: its freedom from attack by microorganisms; its influence on the amount of water absorbed by the capsular film at high relative humidities; the nature of the medicament to be dispensed within the capsule; the effect desired on the hardness, flexibility, and toughness of the capsular wall; and the rapidity of disintegration desired after administration of the capsule.

In general, for semi-rigid capsules, I prefer to use not more than 5 percent of a plasticizer (based on the weight of the dried capsule) and have found invert sugar, manitol, monacetin, triethyl phosphate, and sorbitol to be the most generally useful. Whenever the capsules are to be exposed to an atmosphere of high relative humidity, mannitol, monacetin and triethyl phosphate are superior to invert sugar or sorbitol because the former promote minimal absorption of water in the capsular wall. Invert sugar and sorbitol, on the other hand, promote more rapid disintegration of the capsule in the digestive tract. More rapid disintegration may also be effected by incorporating in the coating composition small quantities of electrolytes, for example, salts of organic acids such as benzene sulfonic acid, toluene sulfonic acid, citric acid, and the like.

The process for the preparation of plasticized methyl cellulose capsules is essentially the same as that used for methyl cellulose alone although when the amount of plasticizer is relatively large, it is desirable to perform the coating and gelation operations at slightly higher temperatures. The plasticizer can be incorporated in the methyl cellulose solution in a number of convenient ways, such as by adding it to the methyl cellulose and then treating the mixture with boiling water, by dissolving the plasticizer in the water first and then heating the solution to boiling before treating the methyl cellulose, or the plasticizer may be dissolved in a small amount of a compatible organic solvent, such as ethanol, and then intimately mixed with the methyl cellulose solution to obtain a clear, substantially bubble-free coating composition.

The preparation of plasticized methyl cellulose capsules is illustrated by the following examples:

Example 1

A mixture of 5.2 kg. of low-viscosity methyl cellulose, designated as 9 centipoise type, and 50 g. of monacetin is treated with 27 liters of boiling water and the mixture allowed to cool, whereupon there is obtained a clear, bubble-free solution. Capsules prepared from this composition, by coating steel pins in accordance with the described process, were found to possess greater flexibility than those made from methyl cellulose alone. The approximate composition of these capsules when at equilibrium with air of 40 percent relative humidity at 20° C. was: methyl cellulose 97 percent, monacetin 1.2 percent, and water 2.1 percent.

Example 2

5.2 kg. of 9 centipoise type methyl cellulose are treated with a hot solution of 150 g. of sorbitol in 27 liters of water, and the resulting mixture is then cooled. Capsules prepared from this composition possessed greater flexibility and dissolved much more readily in artificial gastric juice than those prepared from methyl cellulose alone. For example, capsules prepared from methyl cellulose alone ruptured and liberated the medicaments contained therein when exposed to the action of artificial gastric juice at 37° C. in approximately 10 minutes, but capsules prepared from the same lot of methyl cellulose with the addition of sorbitol, as described above, ruptured and liberated their medicaments in approximately 5 minutes. These capsules when in equilibrium with air of 40 percent relative humidity at 20° C. had approximately the following composition: methyl cellulose 94.3 percent, sorbitol 3.3 percent, and water 3 percent. At high relative humidities these capsules displayed a greater tendency to absorb water than those plasticized with monacetin.

It is frequently desirable to prepare colored and/or opaque capsules in order to serve as a means of identification, to protect the ingredients thereof from the destructive action of light, or merely for aesthetic purposes. Methyl cellulose is very satisfactory for the preparation of capsules of this type and in many instances is superior to gelatin. Generally, the gelatin used for the manufacture of capsules is treated with sulfur dioxide to improve its clarity. However, the sulfur dioxide remaining in the gelatin (or by-products resulting from this treatment) frequently effect a deleterious action on certain colorants such as ponceau SX. Methyl cellulose on the other hand requires no corresponding clarifying treatment, and appears to have no deleterious effects on colorants. Furthermore, since methyl cellulose can generally be utilized with substances within the pH range of 3 to 10, in contrast to the narrow range which must be maintained with gelatin, one is permitted greater freedom in the choice of colorants and is able to obtain different hues from the same colorant by taking advantage of the effect of pH changes in producing such hues.

The colorant used for the preparation of colored methyl cellulose capsules may be an edible dye of plant or animal origin, such as carmine, cudbear, or caramel; or a synthetic certified dye such as amaranth, brilliant blue F. C. F., eosin, erythrosine, guinea green certified, orange I, ponceau 3R, ponceau SX, sunset yellow F. C. F. and tartrazine. Combinations of these or other permissible colorants can be used to obtain methyl cellulose capsules of any desired color.

Example 3

150 g. of sorbitol, 9 g. of ponceau SX, and 1.6 g. of brilliant blue F. C. F. are dissolved in 25 liters of hot water and the resultant solution is added to 5.2 kg. of 9 centipoise type methyl cellulose. This mixture is then stored at about 5° C. for 24 hours to allow the methyl cellulose to dissolve and at the end of this period sufficient water is added to bring the volume to 27 liters, The solution is well mixed and allowed to stand for a few hours to permit separation of air bubbles. This coating composition is then used to prepare brown capsules in the manner described above.

Capsules made in accordance with this example, when in equilibrium with air of 40 percent relative humidity at 20° C., had approximately the following composition: methyl cellulose 93 percent, sorbitol 3.3 percent, brilliant blue F. C. F. 0.03 percent, ponceau SX 0.2 percent, and water 3.5 percent.

Example 4

Substantially 150 g. of sorbitol and 4.4 g. of brilliant blue F. C. F. are dissolved in 27 liters of water and the solution is poured over 5.2 kg. of methyl cellulose, 15 centipoise type, and the mixture is then stored at about 5° C. for 24 hours. It is then thoroughly mixed to obtain a clear uniformly colored solution and allowed to stand an additional 12 hours at about 5° C. to allow the air bubbles to separate. The cold bubble-free solution is then used to prepare blue methyl cellulose capsules according to the described procedure. These capsules when in equilibrium with the air of 40 percent relative humidity at 20° C. had approximately the following composition: methyl cellulose 93.75 percent, sorbitol 2.7 percent, brilliant blue F. C. F. 0.08 percent, and water 3.47 percent.

Opaque capsules prepared from methyl cellulose made by incorporating small amounts of insoluble and inert materials of very small particle size in the capsule-forming composition are much more satisfactory than those prepared from gelatin because the former retain their flexibility where as opaque gelatin capsules display a marked tendency to become brittle and shatter. Moreover, for some unknown reason, the small amount of opacity-producing material expedites the thermogelation of the cellulose ether on the capsule-forming pins and thus permits an increased rate of capsule production. Two of the most frequently used inert materials for the preparation of opaque capsules are charcoal and titanium dioxide. It is necessary that the particle size of the material added to produce opacity be rather small, preferably so that all the material will pass through a No. 200 standard mesh sieve. Uniform distribution of these insoluble materials in methyl cellulose solutions is facilitated by the use of small amounts of natural gums or surface tension depressants, such as "Aerosol OT" (a sodium salt of dioctyl sulfosuccinate). The preparation of opaque capsules is illustrated by the following examples.

Example 5

About 150 g. of sorbitol are dissolved in 27 liters of water and the solution is heated to boiling. 70 g. of titanium dioxide are then slowly added while the mixture is stirred and the hot mixture thus obtained is added to 5.2 kg. of methyl cellulose, 9 centipoise type. The latter mixture is allowed to stand for 24 hours at about 5° C., very thoroughly mixed, and then allowed to stand another 24 hours at about 5° C. to promote separation of air bubbles. The white opaque methyl cellulose capsules prepared from the bubble-free coating composition in the manner described above were flexible and did not become brittle. When in equilibrium with air of 40 percent relative humidity at 20° C. these capsules had the approximate composition: methyl cellulose 93 percent, sorbitol 2.69 percent, titanium dioxide 1.25 percent, and water 3 percent.

Example 6

Substantially 150 g. of acacia (a natural gum), 150 g. of sorbitol, and 5 g. of caramel are dissolved in 27 liters of water and the solution is heated to boiling. To the hot solution 70 g. of titanium dioxide are added slowly while the mixture is stirred and when the addition is complete, the mixture is added to 5 kg. of methyl cellulose, 9 centipoise type. The latter mixture is allowed to stand at about 5° C. for 24 hours, mixed very thoroughly to obtain a uniform distribution of the titanium dioxide, and then stored an additional 24 hours at about 5° C. to promote the separation of air bubbles. The separation of the air bubbles can be facilitated by the addition of a few drops of an antifoam agent such as pine oil or by the use of reduced pressure as previously mentioned. Buff-colored opaque capsules, prepared from this bubble-free coating composition in the manner described above, retained their flexibility even when dried in a vacuum desiccator. When in equilibrium with air of 40 percent relative humidity at 20° C. these capsules had the approximate composition: methyl cellulose 89.75 percent, acacia 2.69 percent, sorbitol 2.69 percent, caramel 0.089 percent, titanium dioxide 1.25 percent and water 3.5 percent.

Example 7

A mixture of 5.2 kg. of methyl cellulose, 9 centipoise type, and 50 g. of monacetin is treated with 27 liters of boiling water and the mixture is allowed to stand at about 5° C. for 24 hours. A mixture of 50 g. of charcoal and 0.5 g. of "Aerosol OT" (100 percent) is triturated in a cold mortar with about a liter of cold water to form a suspension. This suspension is added to the cold methyl cellulose solution, mixed thoroughly and the whole maintained at about 5° C. The mixing is continued until a uniform distribution of the charcoal is obtained. This mixture is then allowed to stand an additional 24 hours to obtain a substantially bubble-free coating composition. From this, dark opaque capsules are prepared in the manner described above. Such capsules, when in equilibrium with air of 40 percent relative humidity at 20° C., had approximately the following composition: methyl cellulose 96.2 percent, monacetin 0.92 percent, charcoal 0.92 percent, "Aerosol OT" 0.0092 percent, and water 2 percent.

By utilizing the unique gel-forming property of methyl cellulose it has been found possible to prepare capsules containing methyl cellulose as the principal component with the admixture of small amounts of compatible cellulose derivatives such as water-soluble hydroxyethyl cellulose, natural gums, and synthetic water-soluble polymers such as "Carbowax 4000" (a polyethylene glycol with an average molecular weight of about 4000). The admixture of these materials to methyl cellulose solutions has the effect of raising the temperature required to induce gel formation and therefore it will in most instances be advisable to use not more than 20 percent of such material (based on the weight of the dried capsule). The preparation of capsules containing such admixed materials is illustrated in the following examples.

Example 8

580 g. of "Carbowax 4000" are dissolved in 27 liters of boiling water and the solution thus obtained is poured over a mixture of 58 g. of monacetin and 5.2 kg. of methyl cellulose, 15 centipoise type. The latter mixture is allowed to stand at about 5° C. for 24 hours to obtain a substantially bubble-free solution suitable for coating. Capsules are prepared from this composition in the manner described above and by performing the dipping and gelation operations at about the upper temperature limits there stated. Capsules so made when in equilibrium with air of 40 percent relative humidity at 20° C. had the approximate composition: methyl cellulose 87.25 percent, "Carbowax 4000" 9.78 percent, monacetin 0.97 percent, and water 2 percent.

Example 9

A mixture of 4.7 kg. of methyl cellulose, 9 centipoise type, 540 g. of water-soluble hydroxyethyl cellulose, and 160 g. of sorbitol is treated with 27 liters of boiling water to obtain a coating composition. Capsules prepared from this coating composition by the process described above when in equilibrium with air of 40 percent relative humidity at 20° C. had the approximate composition: methyl cellulose 83.5 percent, water-soluble hydroxyethyl cellulose 9.6 percent, sorbitol 2.85 percent and water 4 percent.

After methyl cellulose capsules have been filled with a medicinal agent they can be sealed by applying a band of methyl cellulose to the region where the telescoping end of the capsule cap encircles the capsule body. This is conveniently accomplished by extruding a cold 15 percent aqueous solution of the 9 centipoise type onto this region in a thin band and subsequently revolving the capsule until the band has substantially dried. The band applied may be of the same color or a distinctive color from that of the body of the capsule. Other water-soluble cellulose derivatives which can be utilized in aqueous solution as capsule-sealing material are water-soluble salts, such as sodium and ammonium salts, of carboxymethyl cellulose and cellulose acetate-phthalate, and hydroxyethyl cellulose.

Gelatin capsules when in equilibrium with air of 50 percent relative humidity at 20° C. contain about 25 percent of moisture, which causes excessive swelling and renders them unsuitable for mechanical filling operations. Methyl cellulose capsules, plasticized with 3 percent sorbitol, under the same conditions contain 7 percent of moisture and remain wholly suitable for filling operations. If both capsules are stored at 25° C. in an atmosphere dried with silica gel, the moisture content of the gelatin capsule is reduced to 7.5 percent and that of the methyl cellulose capsule to 1.3 percent. The gelatin capsule, however, is now very brittle and is easily shattered or broken upon handling or being otherwise manipulated in filling operations, whereas the methyl cellulose capsule still retains substantially its original flexibility and resistance to breakage under the usual filling conditions. This property of the cellulose capsule is retained even after subsequent drying for 24 hours in vacuum at 50° C., which treatment removes practically all moisture present.

The cellulose capsules, in comparison with gelatin capsules, not only have much greater uniformity and utility under widely varying atmospheric conditions, but are more readily produced in greater uniformity. For example, in machine filling operations with cellulose capsules, accepting all capsules routinely produced in any given period, the largest number of unsatisfactory capsules was less than 1 percent, whereas with gelatin capsules of the "run of the mill" the loss was 15 percent, and sometimes as high as 20 percent.

Since many medicinal preparations must be prepared to contain considerably less than 8 percent moisture (the approximate lower limit of satisfactory utility of the gelatin capsule), the advantage of the methyl cellulose capsule is obvious. Thus, methyl cellulose capsules can, if desired, be dried before filling them with essentially dry medicaments by exposing them to a dry atmosphere or by vacuum drying. A similar procedure is not practical with gelatin capsules since, as mentioned before, gelatin capsules containing much less than 7 percent moisture are too fragile for filling and handling operations. If desired, methyl cellulose capsules containing medicaments can be stored in a container in conjunction with effective drying agents, such as anhydrous calcium chloride, to maintain the medicament in a substantially dry state and prevent deterioration due to the absorption of moisture.

Having described my invention, what I claim and desire to secure by Letters Patent is:

1. A telescoping medicinal capsule, the substance of which comprises a thermo-gelled film of a water-soluble methyl cellulose having a methoxyl content of about 25 to about 35 percent and an intrinsic viscosity of about 7 to about 15 centipoises.

2. A telescoping medicinal capsule, the substance of which comprises a thermo-gelled film of a water-soluble methyl cellulose having a methoxyl content of about 30 percent and an intrinsic viscosity of about 9 centipoises.

3. A telescoping medicinal capsule, the substance of which comprises a thermo-gelled film of a water-soluble methyl cellulose having a methoxyl content of about 25 to about 35 percent and an intrinsic viscosity of about 7 to about 15 centipoises, and a compatible plasticizer therefor.

4. In the process of making a telescoping medicinal capsule, the steps which comprise applying a film of an aqueous solution of a methyl cellulose ether having a methoxyl content of about 25 to about 35 percent and an intrinsic viscosity of about 7 to about 15 centipoises, to a capsule-forming member heated above the gel point of said solution to cause thermo-gelation of a film of methyl cellulose on said member, and maintaining said film and said member continuously in heated condition from the moment of commencement of said thermo-gelation until the film is rendered self-sustaining in form.

5. The method of manufacturing a telescoping medicinal capsule from a water-soluble, thermogellable methyl cellulose having a methoxyl content of about 25 to about 35 percent and an intrinsic viscosity of about 7 to about 15 centipoises, which comprises dipping into an aqueous solution of said methyl cellulose capsule-forming members heated above the gel point of said methyl cellulose to form thereon a film of said methyl cellulose and supplying heat to said capsule-forming member and film thereby maintaining said film in thermo-gelled state, and removing substantially all water from said thermo-gelled film to render said film self-sustaining.

6. The method of manufacturing a telescoping medicinal capsule from a water-soluble methyl cellulose having a methoxyl content of about 25 to about 35 percent and an intrinsic viscosity of about 7 to about 15 centipoises, said method comprising dipping capsule-forming members in an aqueous solution of said methyl cellulose, said members being heated above the gel point of said methyl cellulose and being of a size and shape to permit formation thereon of complementary cap and body portions of said capsules, withdrawing said members from the aqueous solution and rotating said members and partially thermo-gelled film of methyl cellulose thereon to cause formation of a uniform thermo-gelled film on said members and maintaining said members and said thermo-gelled film at a temperature above the gel point of said cellulose derivative, thereby causing evaporation of substantially all moisture from said film and rendering said film in self-supporting condition.

HUBERT W. MURPHY.

REFERENCES CITED

The following references are of record in the file of this patent:

UNITED STATES PATENTS

| Number | Name | Date |
|---|---|---|
| 730,643 | Hance | June 9, 1903 |
| 1,730,377 | Anderson | Feb. 26, 1929 |
| 1,861,047 | Colton | May 31, 1932 |
| 2,031,233 | Stillwell | Feb. 18, 1936 |
| 2,160,782 | Magsberg | May 30, 1939 |
| 2,215,562 | Ogilby | Sept. 24, 1940 |
| 2,216,045 | Powers et al. | Sept. 24, 1940 |
| 2,251,109 | Bratring | July 29, 1941 |
| 2,275,154 | Merrill | Mar. 3, 1942 |
| 2,304,676 | Bratring | Dec. 8, 1942 |
| 2,339,114 | Scherer | Jan. 11, 1944 |
| 2,349,430 | Hiatt | May 23, 1944 |

OTHER REFERENCES

Deakers: Drug and Cosmetic Industry, Feb. 1941, vol. 48, page 152 (167-90).